(12) United States Patent
Zhang et al.

(10) Patent No.: US 8,631,468 B2
(45) Date of Patent: Jan. 14, 2014

(54) ACTIVE ACCESS MONITORING FOR SAFER COMPUTING ENVIRONMENTS AND SYSTEMS

(75) Inventors: Xinwen Zhang, San Jose, CA (US); Jean-Pierre Seifert, Santa Clara, CA (US); Onur Aciicmez, San Jose, CA (US); Afshin Latifi, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 885 days.

(21) Appl. No.: 12/267,990

(22) Filed: Nov. 10, 2008

(65) Prior Publication Data

US 2010/0122314 A1    May 13, 2010

(51) Int. Cl.
*G06F 17/30*    (2006.01)
*G06F 7/04*    (2006.01)
*G06F 15/16*    (2006.01)

(52) U.S. Cl.
USPC .......... 726/4; 726/1; 726/17; 726/26; 726/27; 709/226

(58) Field of Classification Search
USPC ....................................... 726/1–36
See application file for complete search history.

(56) References Cited

U.S. PATENT DOCUMENTS

| | | | |
|---|---|---|---|
| 6,889,212 B1 * | 5/2005 | Wang et al. ............. | 705/59 |
| 7,290,266 B2 | 10/2007 | Gladstone et al. | |
| 7,793,345 B2 * | 9/2010 | Weber et al. ............. | 726/21 |
| 7,873,835 B2 * | 1/2011 | Atzmony et al. ......... | 713/183 |
| 2005/0235352 A1 * | 10/2005 | Staats et al. ............. | 726/14 |
| 2006/0137007 A1 * | 6/2006 | Paatero et al. .......... | 726/22 |
| 2006/0195899 A1 * | 8/2006 | Ben-Shachar et al. ... | 726/12 |
| 2006/0242692 A1 * | 10/2006 | Thione et al. ............. | 726/9 |
| 2009/0274144 A1 * | 11/2009 | Garg et al. ............. | 370/352 |
| 2010/0011417 A1 * | 1/2010 | Adams et al. ............ | 726/4 |

FOREIGN PATENT DOCUMENTS

| | | |
|---|---|---|
| EP | 1 435 030 B1 | 7/2004 |
| EP | 1 944 676 A1 | 7/2008 |

OTHER PUBLICATIONS

Abadi et al., "Access Control based on Execution History," Proceedings of the 10th Annual Network and Distributed System Security Symposium, NDSS, Feb. 2003, 15 pages.

* cited by examiner

*Primary Examiner* — Nathan Flynn
*Assistant Examiner* — Trang Doan
(74) *Attorney, Agent, or Firm* — Kenneth L. Sherman, Esq.; Michael Zarrabian, Esq.; Sherman & Zarrabian LLP

(57) ABSTRACT

Techniques for controlling access are disclosed. The techniques can be used for reference monitoring in various computing systems (e.g., computing device) including those that may be relatively more susceptible to threats (e.g., mobile phones). Allowed access can be disallowed. In other words, permission to access a component can be effectively withdrawn even though access may be on-going. After permission to access a component has been allowed, one or more disallow access conditions or events can be effectively monitored in order to determine whether to withdraw the permission to access the component. As a result, allowed access to the component can be disallowed. Access can be disallowed by effectively considering the behavior of a component in the aggregate and/or over a determined amount of time. By way of example, a messaging application can be disallowed access to a communication port if the messaging application sends more messages than an acceptable limit during a session or in 4 hours. Disallow-access policies, rules and/or conditions can be defined and modified, for example, by end-users and system administrators, allowing a customizable and flexible security environment that is more adaptable to change.

37 Claims, 7 Drawing Sheets

ACTIVE ACCESS MONITORING FOR SAFER COMPUTING ENVIRONMENTS AND SYSTEMS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information is stored in a computer readable medium in a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known and an Operating System (OS) which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as the telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks. It should be noted that SMS can be supported by GSM and MMS can be supported by 2.5G/3G networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mal. Its main standardization effort is done by 3GPP, 3GPP2 and Ope Mobile Alliance (OMA).

The popularity of computing systems, especially mobile communication devices, is evidenced by their ever increasing use in everyday life. Accordingly, techniques the can improve the safety of computing systems, especially mobile communication devices, would be very useful.

SUMMARY OF THE INVENTION

Broadly speaking, the invention relates to computing environments and/or computing systems. More particularly, the invention pertains to improved techniques for controlling access in computing environments and/or computing systems.

It will be appreciated that the techniques, among other things, can be used for reference monitoring in various computing systems (e.g., computing device) including those that may be relatively more susceptible to threats (e.g., mobile phones).

In accordance with one aspect of the invention, it can be determined to disallow access that has been allowed (allowed access). Consequently, allowed access can be disallowed. In other words, permission to access a component can be effectively withdrawn even though access may be on-going. This means that a granted access privilege of a first component (e.g., an application program) to a second (accessible) component (e.g., a system resource) may be effectively terminated. In accordance with one embodiment of the invention, one or more "disallow-access" conditions (or criteria) can be considered in determining whether to disallow allowed access. Generally, a "disallow-access" condition, rule, and/or policy can be an access condition (or criteria) or defined based on an access condition. It will be appreciated that a disallow-access condition can be explicitly defined and/or can be different that an "allow-access" condition used to determine whether to grant permission to access. However, a set of general access condition can effectively serve as both allow-access and disallow access where, for example, violation of an allow-access condition can result in disallowance of access. In another embodiment, after permission to access a component has been allowed, one or more disallow access conditions or events can be effectively monitored in order to determine whether to withdraw the permission to access the component. As a result, allowed access to the component can be disallowed.

In accordance with a related aspect of the invention, allowed access to a component of a computing environment and/or computing system can be disallowed based on one or more "states." Those skilled in the art will appreciate that a state can, for example, be associated with a computing environment and/or computing system (e.g., a system state, an application state) and can include contextual information (e.g., system internal and/or external context). As such, one or more states can effectively define a situation in which a computing device is used and/or a situation in which access occurs (e.g., time of the day, a particular geographical location, number of connections used by an application). One or more states can be effectively used as a condition (rule or policy) to disallow access (e.g., disallow access in the mornings outside of a particular building, disallow access to more than one connection if network traffic is heavy).

In accordance with another aspect of the invention, access can be allowed by effectively considering the behavior of a component in the aggregate and/or over a determined amount of time. In other words, access decisions especially with respect to disallowing access need not be made as atomic decision solely based on a factor at a given time. Rather, access decisions can effectively be made based on measurements of one or more factors including one or more states over a determined amount of time (e.g., an application session). This allows defining and enforcing useful and meaningful access policies and to some extent more useful and meaningful access rules and/or conditions. By way of example, a messaging application can be disallowed access to a communication port if the messaging application sends more messages than an acceptable limit during a session or in 4 hours. Generally, access can be disallowed based on one or more criteria or factors that may be measured or captured over a period of time.

In accordance with yet another aspect of the invention, disallow-access policies, rules and/or conditions can be defined and modified. It will be appreciated that the disallow-access policies, rules and/or conditions can, for example, be defined and modified for example, by end-users and system administrators, allowing a customizable and flexible security environment that is more adaptable to change.

It will also be appreciated that these and other aspects of the invention can be combined.

The invention can be implemented in numerous ways, including, for example, a method, an apparatus, a computer readable (and/or storable) medium, and a computing system (e.g., a computing device). A computer readable medium can, for example, include at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
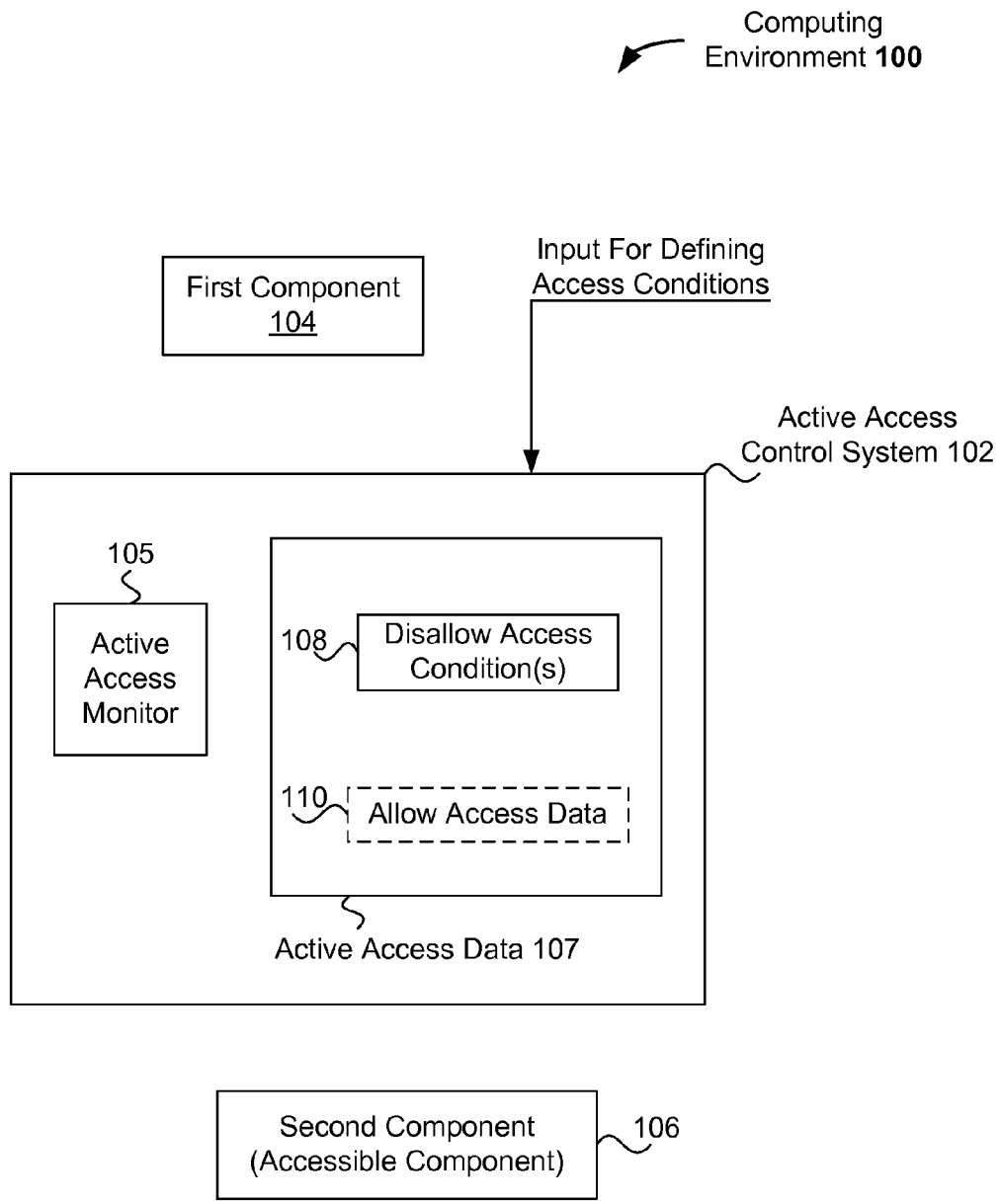
FIG. 1A depicts a computing environment in accordance with one embodiment of the invention.

As noted in the background section, mobile devices are becoming increasingly more popular. Today, wireless networks and mobile communication devices (e.g., Smartphones, cell phones, Personal Digital Assistants) are especially popular. Unfortunately, however, partly because of this popularity, more and more malicious attacks are being directed to wireless networks and mobile communication devices. In addition, recent developments, including relatively new services (e.g., email, file transfer and messaging), and use of common software platforms (e.g., Symbian, Embedded Linux, and Windows CE operating systems) has made mobile communication devices relatively more exposed to malicious attacks. The exposure to malicious attacks could worsen as the wireless networks and mobile communication devices continue to evolve rapidly. Today, wireless and/or portable communication devices (e.g., cell phones, Smartphones) can offer similar functionality as that more traditionally offered by Personal Computers (PCs). As a result, wireless and/or portable communication devices are likely to face similar security problems (e.g., worms, viruses) as those encountered in more traditional computing environments.

Examples of the most notorious threats to cell phones include the Skull, Cabir, and Mabir worms which have targeted the Symbian operating systems. Generally, an MMS-based worm can start attacking initial targets (hit-list) from the network. Each infected phone can scan its contact list and randomly pick up members to deliver a malicious attack in the form of a message. A person can trust an incoming message due to its attractive title or seemingly familiar source and activate the attached file and unwittingly get a phone infected. The infected phone can in turn get other phones infected, and so on. In contrast, a Blue-tooth based worm can take control of a victim phone's Blue-tooth interface and continuously scan for other Blue-tooth-enabled phones within its range. Once a new target has been detected, the worm can effectively connect to other devices and transfers a malicious message to them, and so on.

Taking the cell phone as an example, an active cell phone typically has two security states: susceptible and infected. A susceptible cell phone is not completely protected against worms and may get infected when exposed to a specific worm (e.g., CommWarrior). An infected cell phone can return back to the susceptible state when the user launches a protection (e.g., the CommWarrior patch from F-Secure or Symantec) partly because the cell phone is susceptible to other worm threats. Malware has many other undesirable affects including compromising the privacy of the users.

Generally, safety is a major concern of most modern computing environments including mobile computing environments. As such, controlling access to various components (e.g., resources, executable code) of a computing environment is crucial. However, conventional access monitoring techniques including the prevalent "reference monitoring" techniques do not generally consider the state of the computing environment or the state associated with access, and as such, do not provide access control based on the situation or context in which access is requested. Moreover, conventional reference monitoring techniques do not provide a mechanism to effectively control access to a resource after access has been granted—access is either allowed (or granted) or denied.

It should also be noted that flexible and customizable security environments that allow customization and are readily adaptable to change are not currently available.

In view of the foregoing, improved techniques for controlling access in a computing environment would be useful.

It will be appreciated that the invention pertains to improved techniques for controlling access in a computing environment and/or computing system. The techniques, among other things, can be used for reference monitoring in various computing systems (e.g., computing device) including those that may be relatively more susceptible to threats (e.g., mobile phones).

In accordance with one aspect of the invention, it can be determined to disallow access that has been allowed (allowed access). Consequently, allowed access can be disallowed. In other words, permission to access a component can be effectively withdrawn even though access may be on-going. This means that a granted access privilege of a first component (e.g., an application program) to a second (accessible) component (e.g., a system resource) may be effectively terminated. In accordance with one embodiment of the invention, one or more "disallow-access" conditions (or criteria) can be considered in determining whether to disallow allowed access. Generally, a "disallow-access" condition, rule, and/or policy can be an access condition (or criteria) or defined based on an access condition. It will be appreciated that a disallow-access condition can be explicitly defined and/or can be different that an "allow-access" condition used to determine whether to grant permission to access. However, a set of general access condition can effectively serve as both allow-access and disallow access where, for example, violation of an allow-access condition can result in disallowance of access. In another embodiment, after permission to access a component has been allowed, one or more disallow access conditions or events can be effectively monitored in order to determine whether to withdraw the permission to access the component. As a result, allowed access to the component can be disallowed.

In accordance with a related aspect of the invention, allowed access to a component of a computing environment and/or computing system can be disallowed based on one or more "states." Those skilled in the art will appreciate that a state can, for example, be associated with a computing environment and/or computing system (e.g., a system state, an application state) and can include contextual information (e.g., system internal and/or external context). As such, one or more states can effectively define a situation in which a computing device is used and/or a situation in which access occurs (e.g., time of the day, a particular geographical location, number of connections used by an application). One or more states can be effectively used as a condition (rule or policy) to disallow access (e.g., disallow access in the mornings outside of a particular building, disallow access to more than one connection if network traffic is heavy).

In accordance with another aspect of the invention, access can be allowed by effectively considering the behavior of a component in the aggregate and/or over a determined amount of time. In other words, access decisions especially with respect to disallowing access need not be made as atomic decision solely based on a factor at a given time. Rather, access decisions can effectively be made based on measurements of one or more factors including one or more states over a determined amount of time (e.g., an application session). This allows defining and enforcing useful and meaningful access policies and to some extent more useful and meaningful access rules and/or conditions. By way of example, a messaging application can be disallowed access to a communication port if the messaging application sends more messages than an acceptable limit during a session or in 4 hours. Generally, access can be disallowed based on one or more criteria or factors that may be measured or captured over a period of time.

In accordance with yet another aspect of the invention, disallow-access policies, rules and/or conditions can be defined and modified. It will be appreciated that the disallow-access policies, rules and/or conditions can, for example, by end-users and system administrators, allowing a customizable and flexible security environment that is more adaptable to change.

It will also be appreciated that these and other aspects of the invention can be combined.

Embodiments of these aspects of the invention are discussed below with reference to FIGS. 1A-4. However, those skilled in the art will readily appreciate that the detailed description given herein with respect to these figures is for explanatory purposes as the invention extends beyond these limited embodiments.

FIG. 1A depicts a computing environment 100 in accordance with one embodiment of the invention. Referring to FIG. 1A, an active access control (or controlling) system 102 can be operable to effectively control access to one or more accessible components 106 of the computing environment 100. As such, the active access control system 102 can allow and/or disallow a first component 104 to access an accessible component 106. As a component of the computing environment 100 that can be accessed, the accessible component 106 can, for example, be a resource (e.g., a file, an object, a connection), a program (e.g., an application program), and so on. The first component 104 can, for example, be an application program, an object trying to access another program, object and/or resource, and so on. In general, the first component 104 is a component of the computing environment 100. The first component 104 may be operable to effectively attempt and/or request to access another component of the computing environment 100 that can be accessed (an accessible component). Similarly, the first component 104 can also be a component of the computing environment 100 that can be accessed. Accessing the accessible component 106 can normally include any operation that can be performed on or by a component (e.g., reading, writing, communicating, sending and/or receiving data).

It should be noted that the active access control system 102 can, for example, be provided as a component of a computing system (e.g., a computing device). As such, the active access control system 102 can, for example, be provided for a Personal Computer (PC, a mobile device, a cell phone). As will be described below and appreciated by those skilled in the art, the active access control system 102, can, for example, be provided as a reference monitoring system (or a reference monitor) for a computing system and/or computing environment.

As noted above, the active access control system 102 can be operable to control access to an accessible component 106. More particularly, the active access control system 102 can effectively provide an active access monitor 105 (e.g., a reference monitor, or reference monitoring system or component) that is operable to disallow access to the accessible component 106. The active access monitor 105 can be operable to determine whether one or more "disallow-access conditions" 108 are met after access to the accessible component 106 has been allowed. In other words, the active access monitor 105 can be operable to effectively withdraw permission to access the accessible component 106 which may have been granted to the first component 104 by the active access monitor 105 and/or another system or component (not shown).

Typically, the active access monitor 105 can also be operable to effectively determine whether to allow the first component 104 to access the accessible component 106. In other words, the active access monitor 105 can be operable to first determine whether to allow the first component 104 to access the accessible component 106 based on one or more allow-access conditions that can, for example, be provided as allow-access data 110, as well as being operable to withdraw the permission to access the accessible component 106.

Those skilled in the art will appreciate that an allow-access and a disallow-access condition can be effectively the same condition, policy, rules, event, and so on. In other words, an allow-access condition can, for example, be defined as allow-access: "if condition X is met". In this example, a disallow-access condition can be implicitly defined as disallow-access "if condition X is not true (any more)". However, generally, disallow-access conditions can be independent and/or independently defined from allow-access conditions. As such, a disallow-access condition can, for example, be defined as "(disallow-access if condition Y is met) or (if condition X and Y), or (X and/or Y) are met". Therefore, a disallow-access condition 108 can, for example, be met when one or more access conditions (policies and/or rules) 110 are effectively violated. More generally, a disallow-access condition 108 can be defined based on one or more allow-access conditions, policies and/or rules for allowing access to the accessible component 106.

However, a disallow-access condition 108 can be different than one or more allow-access conditions 110 defined for the same accessible component 106. More generally, a disallow access condition 108 can be explicitly defined for disallowing access to accessible components including the accessible component 106 individually, in groups, or as a whole.

The active access monitor 105 can be operable to effectively monitor one or more access conditions (e.g., allow-access condition, disallow-access condition) in order to determine whether to effectively withdraw the grant of permission to access the one or more accessible components. For clarity, such access conditions are referred to as "disallow-access conditions". But it should be apparent that they can be an access-condition. Those skilled in the art will readily appreciate that a disallow-access condition 108 can, for example, be defined based on one or more variables associated with the computing environment 100. Moreover, a variable can include a state variable associated with a state of the computing environment 100, as will be described in greater detail below. Furthermore, it will be appreciated that the active access control system 102 can receive input for defining access conditions including disallow-access conditions. The input can explicitly and/or implicitly define a disallow-access condition.

The active access monitor 105 can, for example, be operable to effectively detect a change in the value of one or more variables used to define an access condition (e.g., a disallow-access condition 108) after access to the accessible component 106 has been allowed. By way of example, if an access condition 108 is defined to allow access "if a variable X (e.g., a current location) is within a determined range (e.g., within one mile radius of a determined geographical location)," after access to accessible component 106 has been granted, the active access monitor 105 can detect a change in variable X (e.g., a change in current location) and consequently evaluate (or reevaluate) the access condition 108 in order to determine whether to effectively withdraw the permission to access the accessible component 106. In this example, a disallow-access condition may, for example, be defined to disallow access after 5 pm. Consequently, permission to access may be disallowed even if the current location has not changed and it still acceptable.

The active access monitor 105 can be operable to compare the current values of one or more variables including state variables of the computing environment 100 to a set of acceptable and/or unacceptable values in order to allow and/or disallow access to the accessible component 106.

In general, the active access monitor 105 can actively monitor and maintain "active-access" data 107 in order to determine whether to effectively withdraw permission to access the accessible component 106. It should be noted that the first and second components 104 and 106 can be operating on the same device and/or operating in the same device as the active access control system 102. However, the active access control system 102 can operate on or as a different system (or device) to effectively control access to an accessible component provided for another system or device. As such, the first component 104 may be operating on a different system or device than the systems or devices where the active access control system 102 and/or the accessible component 106 operate.

Figure 1B:
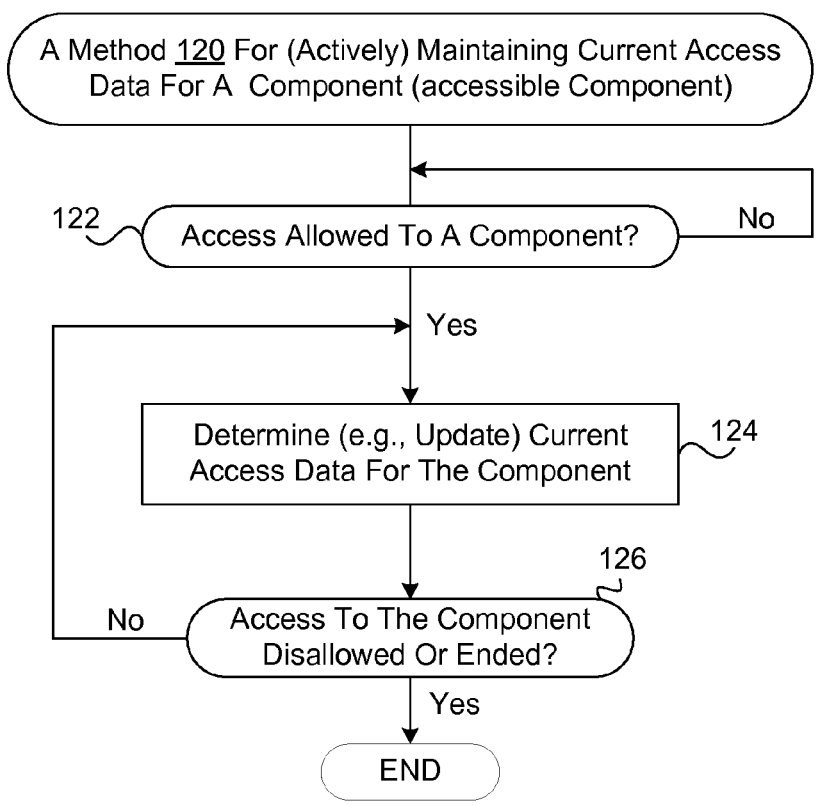
FIG. 1B depicts a method for (actively) maintaining current access data for a component (or accessible component) of a computing environment and/or computing system in accordance with one embodiment of the invention.

FIG. 1B depicts a method 120 for (actively) maintaining current access data for a component (or accessible component) of a computing environment and/or computing system in accordance with one embodiment of the invention. Method 120 can, for example, be performed by the active access monitor 105 depicted in FIG. 1A. Referring to FIG. 1B, initially, it is determined (122) whether access to a component has been allowed. In effect, the method 120 can wait to determine (122) that access to a component has been allowed. If it is determined (122) that access to the component has been allowed, current access data for the component is determined (124). It should be noted that access data can effectively indicate and/or be evaluated to determine whether to disallow access that has been allowed to the component. By way of example, determining (124) of current access data can include maintaining and/or updating access data including obtaining (e.g., receiving, measuring, determining) the current values of one or more variables that effectively define a disallow-access criterion (or condition, policy, rule, and/or event).

After current access data has been determined (124), it is determined (126) whether access to the component has been disallowed or ended. Referring back to FIG. 1B, access can end, for example, as a result of the accessing component and/or the accessible component being no longer operable and/or active (e.g., not executing). If it is determined (126) access to the component has been disallowed or ended, the method 120 ends. However, if it is determined (126) that access to the component has not been disallowed and has not ended, the method 120 proceeds to determine (124) current access data for the component. In effect, the method 120 can keep monitoring and/or updating access data (including disallow-access data) so long as access has not ended or has not been disallowed, thereby effectively monitoring access to the component actively or continually after access has been allowed. Moreover, the current access data can be used to determine whether to disallow access that has been allowed to a component, thereby allowing access to the component to be actively or continually controlled.

Figure 1C:
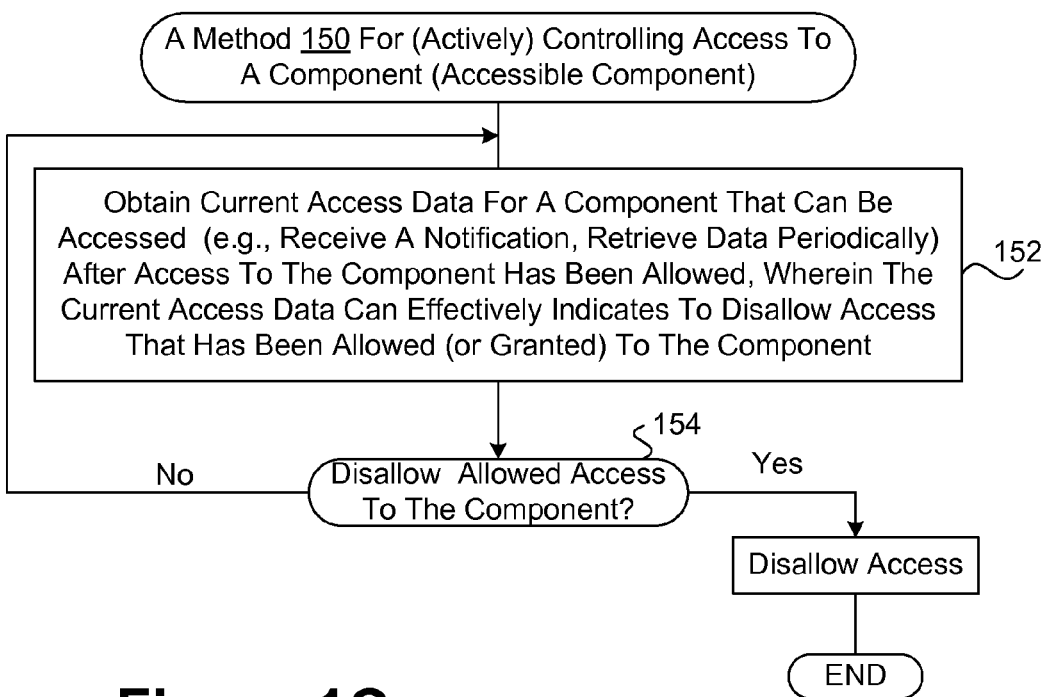
FIG. 1C depicts a method for (actively) controlling access to a component (accessible component) of a computing system and/or computing environment.

To further elaborate, FIG. 1C depicts a method 150 for (actively) controlling access to a component (accessible component) of a computing system and/or computing environment. The method 150 can, for example, be performed by the active access monitor 105 depicted in FIG. 1A. Referring to FIG. 1C, initially, current access data for a component that can be accessed (accessible component) is obtained (152) after access to the accessible component has been allowed. It should be noted that the current access data can effectively indicate to disallow (or whether to disallow) access that has been allowed (or granted) to the component. The current access data can, for example, be maintained in an active manner after access has been allowed to the component in a similar manner as the method 120 depicted in FIG. 1B. Referring back to FIG. 1C, after the current access data has been obtained (152), allowed access can be disallowed (154) as effectively indicated by the current access data. Those skilled in the art will readily appreciate that methods 120 and 150 (respectively depicted in FIGS. 1B and 1C) can be combined and/or effectively performed by a single component or system (e.g., active access monitor 105 depicted in FIG. 1A).

Figure 1D:
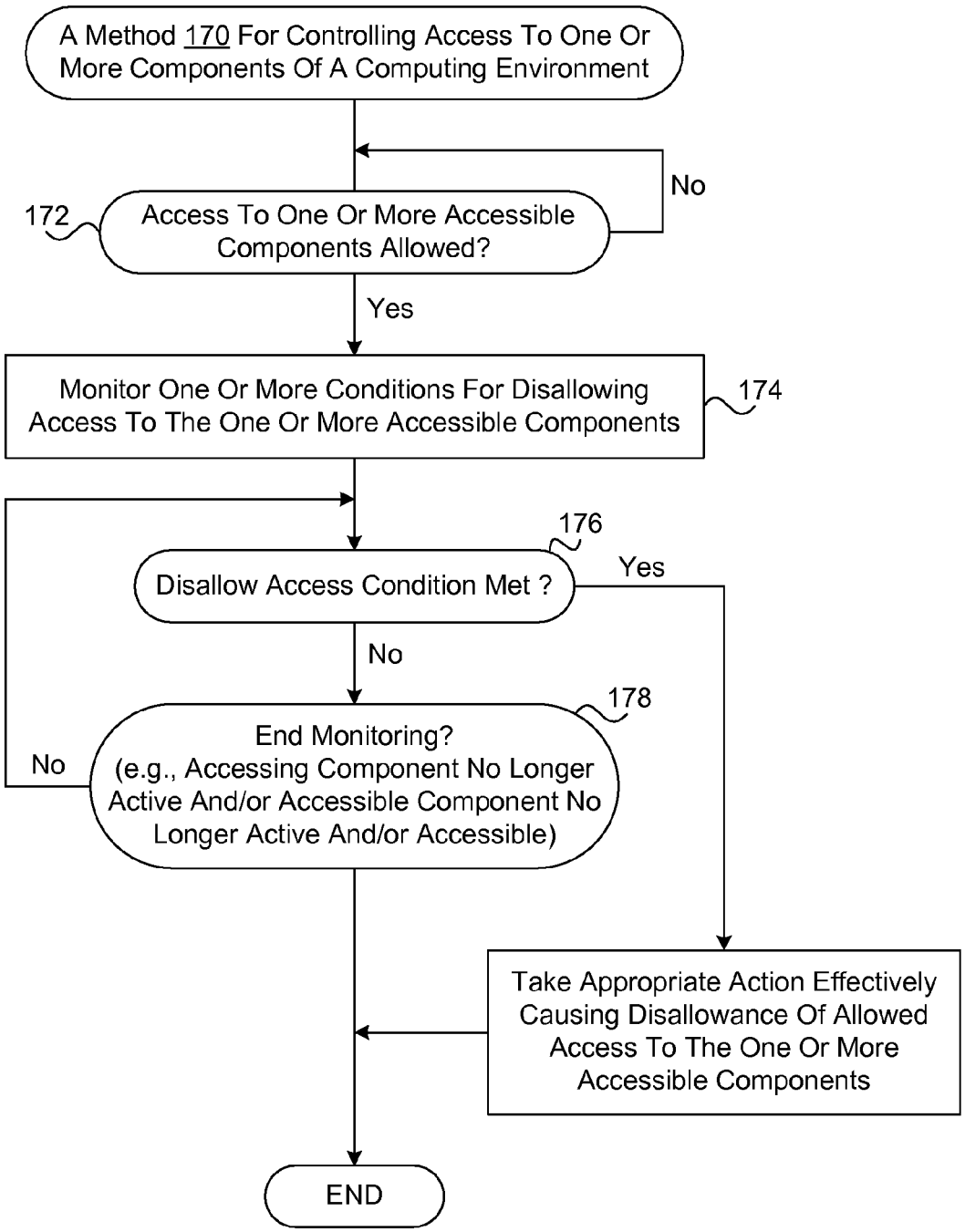
FIG. 1D depicts a method for controlling access to one or more components of a computing environment in accordance with another embodiment of the invention.

FIG. 1D depicts a method 170 for controlling access to one or more components of a computing environment in accordance with another embodiment of the invention. The method 170 can, for example, be performed by the active access monitor 105 depicted in FIG. 1A. Referring to FIG. 1D, initially, it is determined whether access to one or more accessible components has been allowed (172). In effect, the method 170 can wait for a determination (172) that access to one or more accessible components has been allowed. If it is determined (172) that access to one or more accessible component has been allowed, one or more conditions for disallowing access to the one or more accessible components are monitored (174). As noted above, a condition for disallowing access can, for example, be explicitly defined as a disallow access condition and/or be defined implicitly based on an allow-access condition. In any case, based on the monitoring (174) of one or more conditions (disallow-access conditions), it can be determined whether a disallow access condition has been met. If it is determined (176) that a disallow-access condition has been met, appropriate action can be taken to effectively cause the disallowance of access to the one or more accessible components before the method 170 ends.

On the other hand, if it is determined (176) that a disallow-access condition has not been met, it is determined (178) whether to effectively end the monitoring of the disallow-access condition(s). By way of example, it can be determined (178) whether the component that has been allowed access (or accessing component) is no longer active and thus incapable of accessing the accessible component and/or whether the accessible component is on longer active and/or inaccessible. If it is determined (178) to end monitoring of the one or more conditions for disallowing access (disallow-access condition), the method 170 ends. However, if it is determined not to end monitoring of the one or more conditions for disallowing access, the method 170 proceeds to determine (176) whether the disallow-access condition has been met for disallowing access to the one or more accessible components. In effect, method 170 can continue to monitor (174) one or more conditions for disallowing access and reevaluate one or more disallow-access conditions, policies, and/or rules to determine whether to disallow access to the one or more accessible components.

As noted above, the active access monitor 105 (depicted in FIG. 1A) can, for example, include a reference monitoring system or a reference monitor in accordance with one embodiment of the invention. In addition, a disallow access condition can include and/or be based on one or more state variables associated with a computing system and/or computing environment.

Figure 2A:
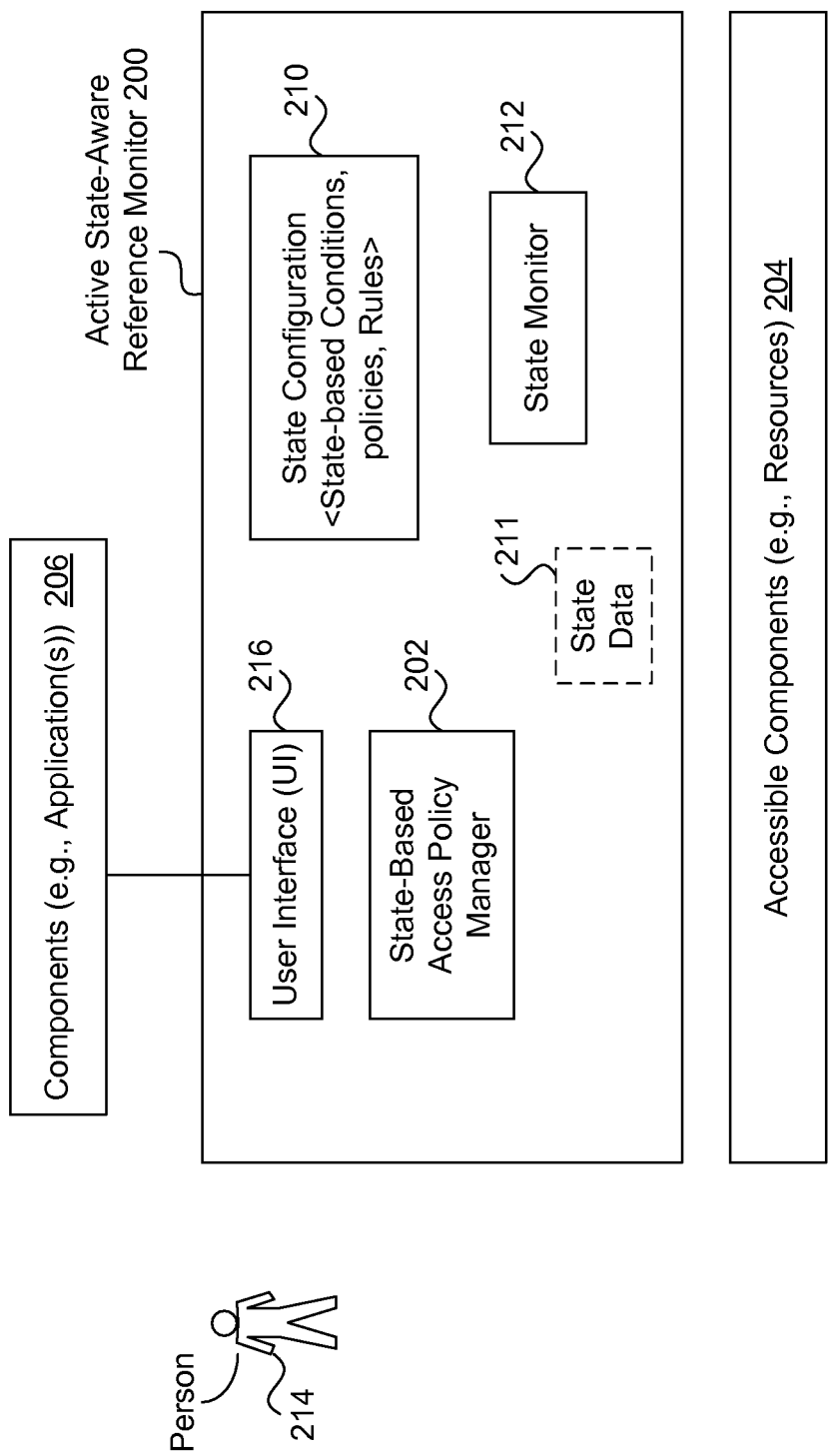
FIG. 2A depicts an active state-aware reference monitor 200 in accordance with one embodiment of the invention.

To further elaborate, FIG. 2A depicts an active state-aware reference monitor 200 in accordance with one embodiment of the invention. Referring to FIG. 2A, a state-based access policy manager 202 is operable to effectively control access to one or more accessible components 204. The accessible components 204 can, for example, be one or more resources including an operating system, as will be known to those skilled in the art. One or more components 206 can effectively attempt and/or request to access one or more of the accessible components 204. By way of example, one or more component 206 can be one or more application programs (or applications) attempting to access one or more files, connections and/or services of a computing device by making one or more system calls provided by an operating system operating on the computing device (e.g., a PC, a cell phone).

The state-based access policy manager 202 is operable to allow a component 206 to access a component 204. Moreover, the state-based access policy manager 202 is operable to disallow access to the component after access has been allowed even though the component 206 may still be active and/or still accessing or trying to access the component 204. It will also be appreciated that the state-based access policy manager 202 can effectively make decisions regarding allowance and/or disallowance of access based on one or more state-based conditions, policies and/or rules stored as state configuration 210. Generally, a state-based condition, policy, and/or rule 210 can include and/or be effectively defined based on one or more state variable associated with a computing environment and/or computing system. A state monitor 212 can effectively monitor the state variables and provide the state-based access policy manager with the current value of the variables to effectively allow the state-based access policy manager 202 to make informed decisions regarding allowance and/or disallowance of access based on one or more state variables associated with one or more conditions, policies, and/or rules defined for allowance and/or disallowance of access to one or more components 204. It should be noted that the conditions, policies, and/or rules 210 can be effectively defined based on input provided by a person 214 who can interact with a User Interface (UI) in order to explicitly and/or implicitly define one state-based access rule. It should also be noted that the state-based access policy manager 202 and the state monitor 212 can collectively and effectively monitor one or more state-based conditions, policies, and/or rules including a state-based disallow-access condition, policy and/or rule defined for disallowing access to one or more components 204. This monitoring can, for example, be performed when a component 206 is accessing one or more of the accessible components 204, when the component 206 is executing and/or is active, and when the component 206 is not requesting to access the one or more components 204. Determining whether a disallow-access condition is met or has been met can be based on determining whether state access data (or state data) has been modified after permission to access an accessible components 204 has been granted, thereby allowing access to be actively controlled. State data can, for example, be stored with the state configuration 210 or separately as state data 211 as depicted in FIG. 2A. By way of example, state data stored as state configuration 210 can include stored state of a state variable when access was allowed. The state configuration data 210 can define an acceptable range for the state variable change. A change of value of the state variable with respect to the stored value can result in determining whether the current value of the state variable is within the acceptable range. A state variable can, for example, be a current geographical location of a computing device. The current geographical location can be effectively monitored by the state monitor 212. If change in the location is detected after access has been allowed, then a disallow-access condition or rule can be effectively evaluated in order to determine whether to disallow access to a resource 204 even though access may be on-going. As such, access to a resource 204 can, for example, be disallowed when the state monitor 212 detects a change in a geographical location which is beyond an acceptable range defined by an access condition, policy, or rule. Generally, the state-based access policy manager 202 and state monitor 212 can collectively and effectively monitor access to one or more accessible components 204 after access to them has been granted. The monitoring can include monitoring one or more access states including one or more access state variables and/or parameters associated with a computing environment and/or computing device. Access state data 211 (or state data) can, for example, include one or more of the following: component data associated with one or more accessible components 204 and/or one or more components 206, one or more component states associated with states of the components 206 and/or the accessible components 204, contextual data associated with one or more contextual variables of a computing environment and/or computing system. Internal contextual data associated with one or more internal contextual variables that are internal to a computing environment and/or computing system and external contextual data associated with one or more external contextual variables that are external to a computing environment and/or computing system. Contextual data and/or a contextual variable can, for example, be determined based on one or more internal and/or usable components of a computing system, one or more internal factors and/or elements which are internal or external to a computing system, an environmental factor and/or element, an environmental factor and/or element associated with one or more humans interacting with one or more active applications on said computing system, environmental context of use associated with an environment of one or more humans as they interact with one or more active applications on a computing system, a geographical and/or physical factor and/or element, time, date, location, mode, mode of operation, condition, event, speed and/or acceleration of movement, power and/or force.

It should also be noted that the state-based access policy manager 202 can be operable to obtain (e.g., retrieve, receive, determine) one or more state-based access conditions, policies and/or rules from the state configuration 210 and/or another source (not shown) to disallow access to one or more accessible components 204.

Figure 2B:
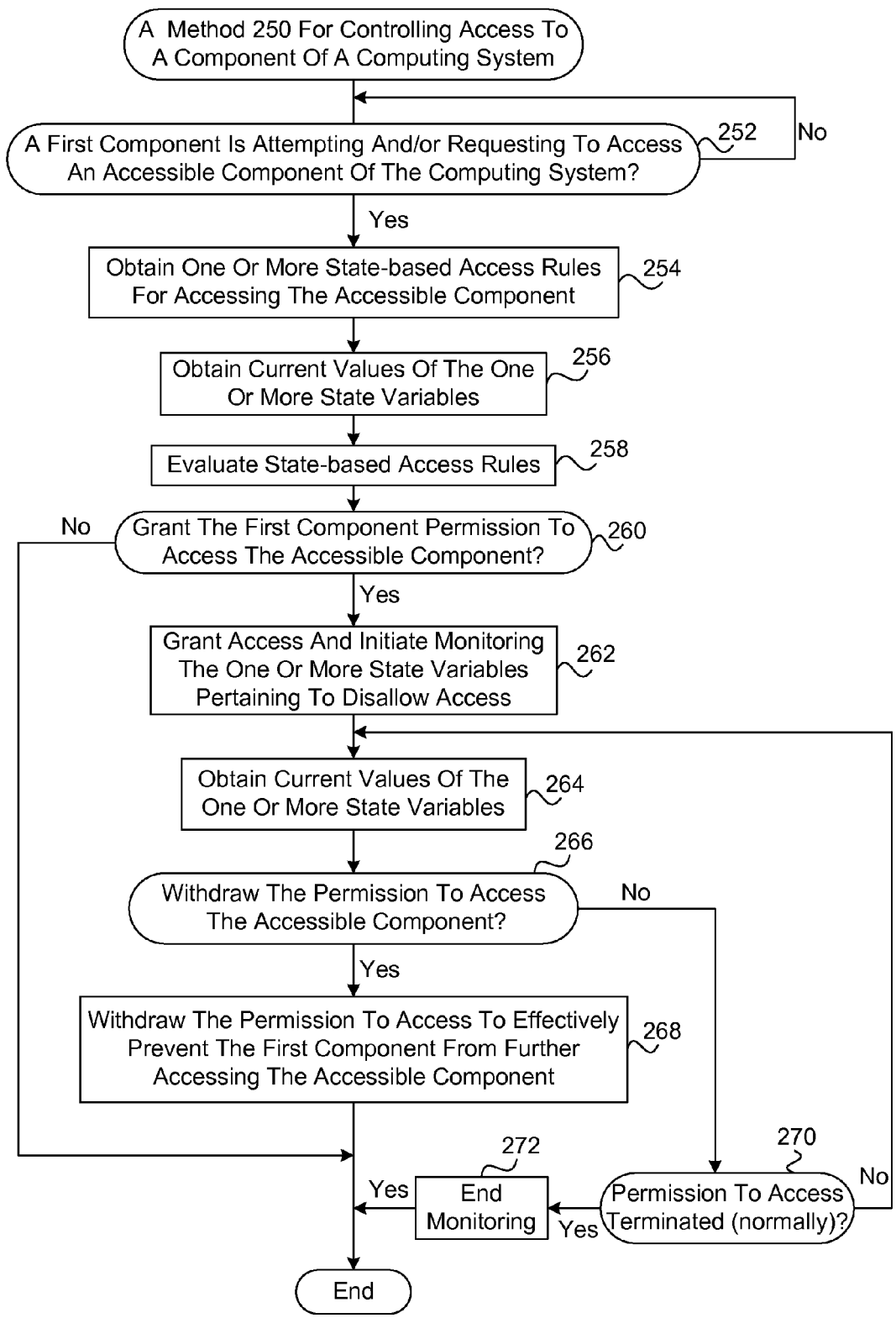
FIG. 2B depicts a method for controlling access to a component of a computing environment and/or computing system in accordance with one embodiment of the invention.

FIG. 2B depicts a method 250 for controlling access to a component of a computing environment and/or computing system in accordance with one embodiment of the invention. Method 250 can, for example, be performed by the active state-aware reference monitor 200 depicted in FIG. 2A. Referring to FIG. 2B, initially, it is determined (252) whether a first component is attempting and/or requesting to access an accessible component of the computing environment and/or computing system. In effect, the method 250 can wait for a determination (252) that a component is attempting and/or requesting to access an accessible component. If it is determined (252) that the first component is attempting and requesting to access an accessible component, one or more state-based access rules (policies or conditions) for accessing the accessible component are obtained (254). The one or more state-based access rules can effectively define one or more access rules for both allowing and disallowing access to the accessible component. A state-based access rules can, for example, be defined for the component that effectively attempts and/or requests to access the accessible component. An access rule can also be defined based on the accessible component. In any case, one or more current values for one or more state variables of the state-aware rules can be obtained (256) for the one or more state-based access rules. By way of example, if the state-based access rule is defined based on a geographical location as a state variable, the current value of the state variable, namely, the current geographical location can be obtained (256). Based on the current value of one or more state variables, the one or more state-based access rules can be evaluated (258) to effectively determine whether to allow the first component to access the accessible component. Accordingly, it is determined (260) whether to grant access permission to the first component for accessing the accessible component. If it is determined (260) not to grant (or deny) the first component permission to access the accessible component, the method 250 ends. However, if it is determined (260) to grant access permission to the first component, permission to access the first component is granted (262) and monitoring of the one or more state variables are initiated (262). These state variables can be the same state variables for determining whether to grant permission to the first component and/or they can be one or more different variables.

Generally, the one or more state variables that are effectively monitored (262) can pertain to one or more disallow access rules, policies and/or conditions. The rules, policies and/or conditions can be the same or similar to the rules, policies and/or conditions defined for allowing access. As such, the one or more state variables being monitored can be the same state variables used to evaluate whether to permit access to the accessible component in the first place. By way of example, the same geographical location used to determine whether to allow access to an accessible component can be monitored in order to detect an effective violation of an access rule, such as, moving a computing device outside a determined (acceptable) geographical area. However, it should be noted that monitoring (262) of the state variables can, additionally or in the alternative, include monitoring a completely different set of state variables including, for example, time, network traffic, number of network connections being used in general or used by a specific accessing component, and so on. Referring back to FIG. 2B, the current values of the one or more state variables are obtained (264). Thereafter, based on the current values of the one or more state variables, it is determined (266) whether to effectively withdraw the permission to access the accessible component (266). By way of example, one or more state-based rules defining the initial access condition can be reevaluated based on the current values of the one or more state variables. This reevaluation can, for example, be performed when a change in the value of a monitored state variable is detected with respect to a stored value (e.g., a value stored when access was initially granted). If it is determined (266) to effectively withdraw the permission to access the accessible component, the permission to access the accessible component can be effectively withdrawn (268) to prevent the first component from further accessing the accessible component and the method 250 ends.

On the other hand, if it is determined (266) not to withdraw the permission to access the accessible component, it can effectively be determined (270) whether permission to access has terminated normally. The permission to access can be terminated normally (or end), for example, when the first component is no longer active (e.g., not executing) and/or the accessible component is no longer accessible. If it is determined (270) that the permission to access has terminated normally, monitoring of the one or more state variables and the method 250 can both end. However, if it is determined (270) that the permission to access the accessible component has not terminated normally, the current values of the one or more state variables is obtained (268) and it is determined (266) whether to withdraw the permission to access the accessible component. In effect, the method 250 can continue to monitor the one or more state variables needed to determine whether to disallow access of the components until it is determined (266) to withdraw the permission to access or it is determined (270) that permission to access has terminated normally.

Figure 3:
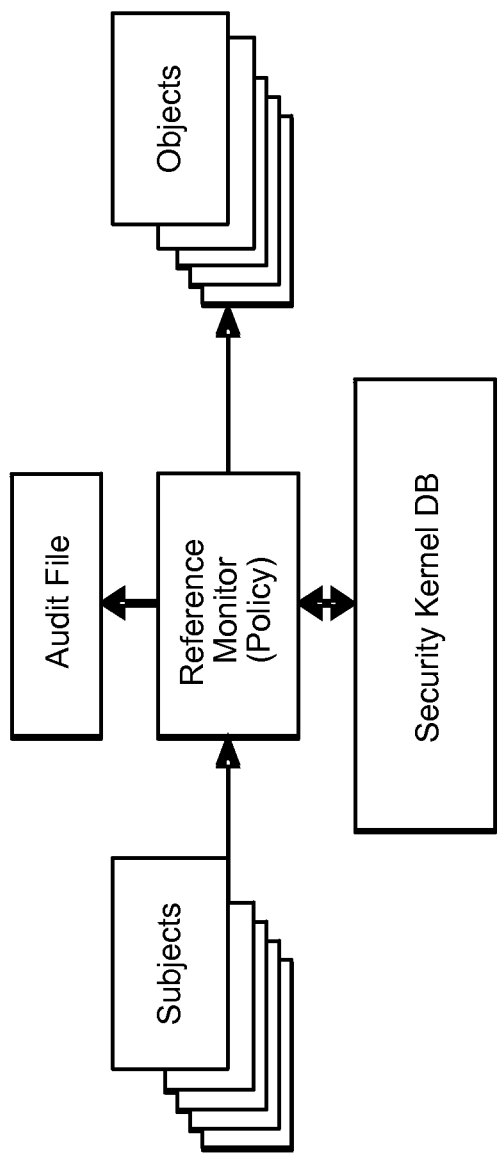
FIG. 3 depicts a reference monitoring architecture compatible with the techniques of the invention.

As noted above, an active state monitor 105 (depicted in FIG. 1A) can be a reference monitoring system or a reference monitor. FIG. 3 depicts a reference monitoring architecture compatible with the techniques of the invention. Those skilled in the art will readily appreciate that various access control or reference monitoring techniques can be utilized in accordance with the invention as no assumptions need to be made regarding the specific architecture or techniques used for providing access control or reference.

Furthermore, those skilled in the art will readily know and appreciate that a state-aware reference monitor can, for example, be provided as a component of an Operating System (OS) (e.g., SELinux) and/or Middleware (e.g., Java Virtual Machine (JVM) in accordance with various embodiments of the invention. The state-aware reference monitor can, for example, effectively determine whether to allow a process or an application to access one or more specific objects (e.g., files, network connections, devices), as well as effectively determining whether to allow the process or application to access general system resources via, for example, a system call or an Application Programming Interface (API).

Moreover, a state-aware reference monitor provided in accordance with the invention need not merely enforce rules and/or policies defined based on static labels or static permissions but it can effectively check the permitted permissions actively or on a continued basis to ensure that an access policy has not been violated and/or enforce disallowance rules or policies.

Unlike conventional techniques, access decisions need not be made solely based on an access request or on a request by request basis where there may not be an effective way to control access after it had been granted even though there may be critical state changes. Rather, access decisions can also be made based on monitoring various states of a computing device and/or computing environment to actively or continually control access.

In other words, access (or security) decisions need not made only at the access request point, but they can be made after access is or has been granted to, among other things, support a "session-aware" access control mechanism that can make access decision based the effective behavior of an accessing component during a determined time (or session). This behavior can be measured based on various state variables. For example, the number of network connections used and/or traffic generated by an application in a given period of time can be considered and access to various networking resource can be effectively withdrawn if the number of network connections or traffic generated is deemed unacceptable. In addition to disallowing access, the execution of an application may be terminated if its behavior measured based on one or more state conditions (or variables) are not deemed acceptable.

Those skilled in the art will also appreciate that various kinds and forms of system states and application states can be considered. Furthermore, the states, state-based rules, state-based conditions, and/or state-based policies can be defined and configured by end-users on an individual basis as a group, or as a whole, for example, by a system administrator, allowing customization of the security requirements for individuals, groups, and so on. It should be noted that the states, state-based rules, state-based conditions and/or state-based policies can, for example, be changed, modified and/or updated by end-users and/or administrators providing the ability to adapt to change in flexible and customizable security environment.

Still further, it will be appreciated that numerous other advantages can be realized. As an example, fine-grained control of application behavior can be realized by, for example, providing context-aware and/or location-aware security in contrast to conventional reference monitoring systems including, for example, the Mobile Information Device Profile (MIDP) security framework in J2ME. As generally known in the art, MIDP is a specification published for the use of Java on embedded devices such as mobile phones and PDAs. MIDP is part of the Java Platform, Micro Edition (Java ME) framework and can use a Connected Limited Device Configuration, a set of lower level programming interfaces. As another example, an ongoing communication can be effectively terminated if a state-based security condition, rule, or policy is violated. As yet another example, use of a resource (or resource usage) can be controlled to, for example, effectively control network bandwidth used by a particular application.

As still another example, a storage source (e.g., persistent storage) can be shared between applications in a controlled manner based on one or more states, state-based rules, state-based conditions, and/or state-based policies. In particular, this controlled sharing can effectively isolate persistent storages to address more recent threats to security of computing devices as will be appreciated by those skilled in the art.

In contrast to conventional techniques, reference monitoring need not be solely dependent and end solely based on atomic permission checks (e.g., send or do not send a SMS or MMS, allow or do not allow a phone call to be made, allow or do not allow UMTS connection or TCP connection). Such atomic checks do not rely on application history that can be captured with respect to various states (e.g., total network traffic used in a day, maximum number of MMS messages sent this week). It will be appreciated that application history can be considered and effectively used to make access decisions including disallowing access based on one or more states in accordance with the invention.

In addition, states being considered in making these access decisions can include contextual information. The contextual information can, for example, be used for: location-based rules (e.g., access allowed only with a particular geographical range, or access disallowed inside or outside of a geographical range), time-based rules (e.g., disallow a game application from sending SMS during peak time), system-based rules (e.g., can only access UMTS while (or so long as) no other concurrent connections are made).

Figure 4:
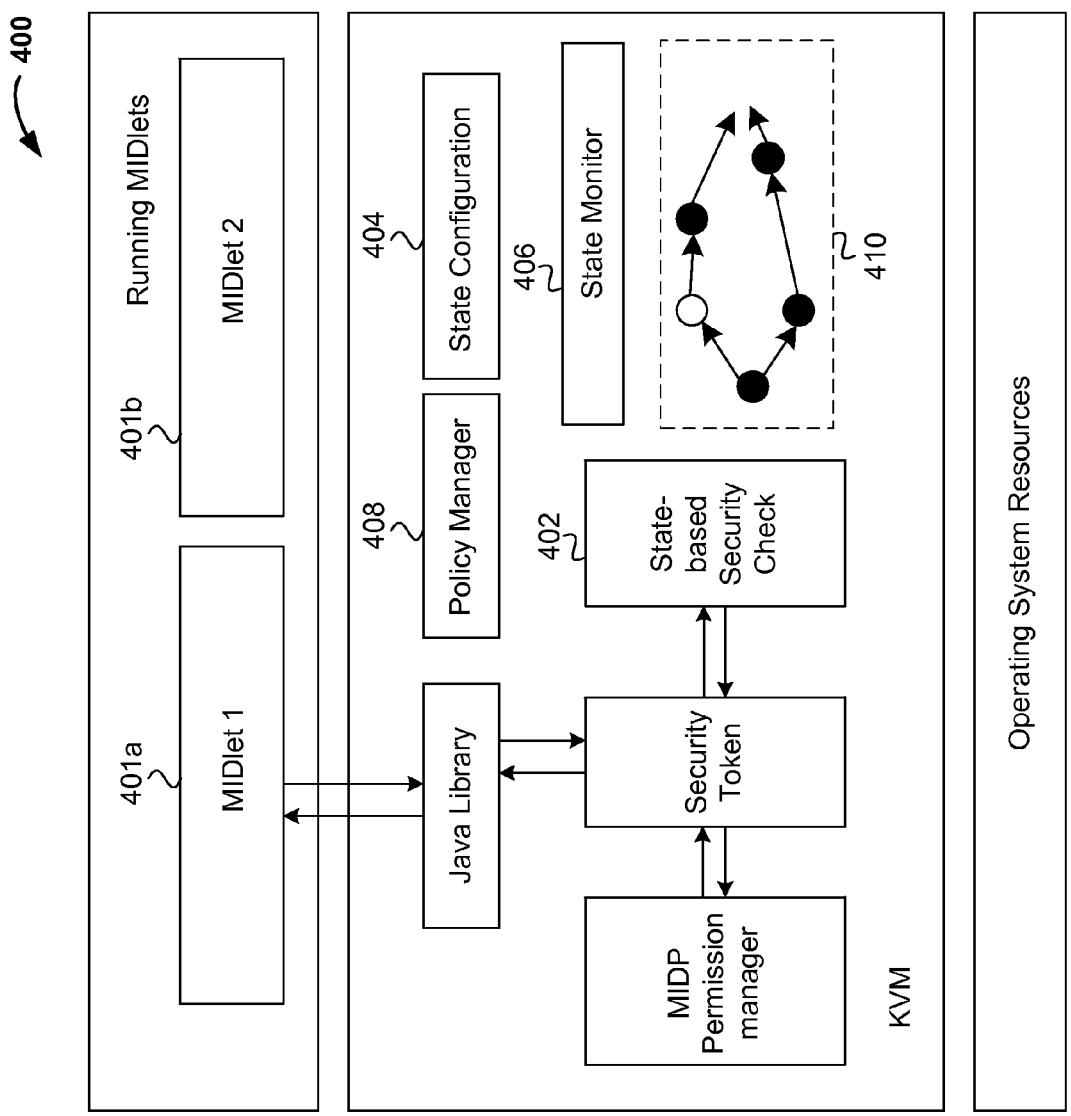
FIG. 4 depicts J2ME complaint computing environment in accordance with one embodiment of the invention.

The techniques of invention, among other things, can extend the J2ME security model and architecture to provide a state-aware security policy, as will be appreciated by those skilled in the art. To further elaborate, FIG. 4 depicts J2ME complaint computing environment 400 in accordance with one embodiment of the invention. Referring to FIG. 4, one or more Java programs for embedded devices machine ("MIDIet's") 401 can be supported by a K virtual machine (KVM). As generally known in the art, a KVM can be a virtual machine developed by Sun Microsystems, derived from the Java virtual machine (JVM) specification. Typically, a KVN is provided for smaller and/or embedded devices and supports a subset of the features of the JVM. A state-based security check component 402 can effectively enforce state-based access (including disallow-access) policies, conditions and/ or rules stored in the state configuration 404. The state-based security check component 402 can effectively enforce state-based access policies, conditions and/or rules based on the monitoring of the states (or state variables) performed by the state monitor 406.

An access policy manager (or policy manager) 408 can be effectively used to define and modify access policies, conditions and/or rules. Those skilled in the art will readily appreciate that the state-based security check component 402, state configuration 404, state monitor 406, and policy manager 408 can, for example, be provided as new "classes" in the framework of the J2ME.

More particular, in addition to a MIDP permission domain check, a "SecurityToken" class can invoke a state-based security check querying the current runtime state of a MIdlet 401.

The state monitor 406 can obtain application and system information pertaining to various state and runs a "state-transition logic" 410 (e.g., a Finite State Machine (FSM)). The state-based security check can query the state information and based on an access policy, condition and/or rule to make a state-based access decision. This state-based access decision can be effectively combined with a MIDP permission check such that access can be allowed if both the state-based access decision and MIDP permission check allow it.

The policy manager 408 can provide an interface for user and/or service provider to allow defining various states associated with the Midlets 401. By way of example, states can be monitored and reported based equipped sensors, overall system state, the resource usage status of the a MIdlet 401, and so on.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system to make state-aware security decisions, comprising:
    an active state-aware reference monitor including:
        a state-based access policy manager component operable to:
            receive input that effectively defines one or more state-based access conditions and/or rules for allowing and/or disallowing access to one or more accessible components;
            generate based on said input one or more state-based access conditions and/or rules that include one or more state variables associated with said computing environment; and
        a state monitor operable to monitor said one or more state variables;
    the active state-aware reference monitor operable to perform state-based security access policies to control access to said one or more accessible components of a computing environment by:
        determining whether one or more state-based disallow-access conditions for disallowing access to said one or more accessible components are met after access to said one or more accessible components has been allowed to effectively grant permission to access said one or more accessible components; and
        determining to disallow access to said one or more accessible components when said determining determines that said one or more state-based disallow-access conditions have been met, thereby allowing said permission to access said one or more accessible components to be effectively withdrawn if said one or more disallow-access condition are met.

2. The computing system of claim 1, wherein one or more of the following are true:
    wherein said one or more state-based disallow-access conditions are met when one or more access conditions and/or rules for allowing access to said one or more accessible components have been violated, and
    wherein said one or more state-based disallow-access conditions are defined based on one or more allow-access conditions and/or rules for allowing access to said one or more accessible components.

3. The computing system of claim 1, wherein one or more of the following are true:
    wherein said one or more state-based disallow-access conditions are different than one or more allow-access conditions and/or rules defined for allowing access to said one or more accessible components, and/or
    wherein said one or more state-based disallow-access conditions are explicitly defined for disallowing access to said one or more accessible components.

4. The computing system of claim 1, wherein said active state-aware reference monitor is further operable to:
    effectively monitor said one or more state-based disallow-access conditions to determine whether said one or more state-based disallow-access conditions are met.

5. The computing system of claim 1,
    wherein said active state-aware reference monitor provides session-aware access control based on the state variables; and
    wherein active access monitoring component is further operable to:
        detect a change in the values of said one or more variables after access to said one or more accessible components has been allowed.

6. The computing system of claim 1, wherein said active state-aware reference monitor is further operable to:
    compare the current values of said one or more variables in an active session to unacceptable values of said one or more variables defined for disallowing access.

7. The computing system of claim 5, wherein said one or more variables include one or more state variables associated with said computing environment including location of a computing device of the computing system.

8. The computing system of claim 1, wherein state-based access decisions are combined with state-based permission checks.

9. The computing system of claim 8, wherein said computing device is and/or includes a mobile device.

10. The computing system of claim 9, wherein said mobile device is one or more of the following: a mobile phone, a smart phone, a Personal Digital Assistant.

11. The computing system of claim 1, wherein said reference monitor controls access to resources of an operating system of said computing device.

12. The computing system of claim 1, wherein said one or more disallow-access conditions are defined by one or more allow-access conditions for allowing access to said one or more accessible components.

13. The computing system of claim 1, further comprising:
    a state configuration storage that stores said one or more one or more state variables;

wherein said access policy manager component is operable to store said one or more state-based access conditions and/or rules in said state configuration storage; and wherein said state monitor is operable to access said state configuration storage and obtain said one or more state-based access conditions and/or rules in order to determine said one or more state variables to monitor.

14. The computing system of claim 1 wherein said computing system receives an input via a User Interface (UI) from a person, thereby allowing said person to effectively define said one or more state-based access conditions and/or rules for accessing said accessible component.

15. The computing system of claim 13, wherein said determining of whether to disallow access to said one or more accessible components comprises:

determining whether to disallow said first component from accessing said one or more components based on access data that has been modified after said accessing allows said first component to access said second component, thereby allowing access to be actively controlled and/or monitored after access has been allowed.

16. The computing system of claim 1, wherein said disallow-access conditions are based on measurements of one or more factors taken over a period of time.

17. The computing system of claim 16, wherein said one or more factors include and/or are based on one or more states variables.

18. The computing system of claim 1, wherein said one or more factors include and/or are based on one or more states variables including at least one of accessing one or more application programs and exceeding a predetermined number of connections.

19. A method of controlling access to one or more accessible components of a computing environment, wherein said method comprises:

monitoring, using an active state-aware reference monitor, one or more state-based disallow-access conditions after permission to access said one or more accessible components has been granted, wherein each state-based disallow-access condition defines a condition for a state variable associated with said one or more accessible components, and wherein allowed access to said one or more accessible components is disallowed when at least one of said state-based disallow-access conditions has been met, and;

determining, based on said monitoring of said one or more state-based disallow-access conditions, whether at least one of said one or more disallow-access conditions has been met; and withdrawing said permission to access said one or more accessible components when at least one of said one or more state-based disallow-access conditions has been met.

20. The method of claim 19, wherein said method further comprises one or more of the following:

generating an indication that effectively indicates to disallow allowed access to said one or more accessible components;

disallowing allowed access to said one or more accessible components when said determining determines to disallow access to said one or more accessible components; and causing allowed access to said one or more accessible components to be disallowed when said determining determines to disallow access to said one or more accessible components.

21. The method of claim 19, wherein:

said allowed access allows a first component to access said one or more accessible components; and said first component is disallowed from accessing said one or more accessible components when said allowed access is disallowed.

22. The method of claim 21, wherein said monitoring of said one or more disallow-access conditions is performed when one or more of the following are true:

said first component is accessing said one or more accessible components;

said first component is executing and/or is active; and said first component is not requesting access to said one or more accessible components.

23. The method of claim 22, wherein:

said one or more accessible components include one or more of the following:

one or more resources, one or more system calls, one or more files, one or more objects, one or more connections, one or more networks connections, on or more applications, one or more MIDlets, one or more modules, one or more functions, and one or more procedures; and said first component includes one or more of the following:

one or more programs, one or more application programs, one or more objects, one or more MIDlets, one or more modules, one or more functions, and one or more procedures.

24. The method of claim 19, wherein said active state-aware reference monitor provides session-aware access control based on monitoring state variables and said method further comprises determining of whether said one or more disallow-access conditions are met is made based on access data that has been modified after said after permission to access said one or more accessible components has been granted, thereby allowing access to be actively controlled.

25. The method of claim 24, wherein:

access data includes state data associated with said computing environment; and said method further comprises:

detecting a change in said state data associated with allowing and/or disallowing access to said one or more components.

26. The method of claim 19, further comprising one or more of the following:

effectively monitoring access to said one or more components after access to said one or more components has been granted; and effectively monitoring one or more access states including one or more state variables and/or parameters associated with said computing environment.

27. The method of claim 26, wherein:

said access data includes state data associated with one or more states of said computing environment; and said method further comprises:

detecting a change in said state data.

28. The method of claim 27, wherein said method further comprises:

maintaining and/or modifying said state data after access to said one or more accessible components is allowed.

29. The method of claim 28, wherein said maintaining and/or modifying are performed when said one or more accessible components are being accessed.

30. The method of claim 29, wherein said state data includes one or more of the following:

components of said computing system, and/or one or more components accessing and/or attempting to access said one or more accessible components;

one or more component states associated with states of one or more components of computing environment;

contextual data associated with one or more contextual variables associated with said computing environment;

internal contextual data associated with one or more internal contextual variables external to said computing environment; and external contextual data associated with one or more external contextual variables external to said computing environment.

31. The method of claim 19, wherein said computer-implemented method further comprises:

obtaining one or more state-based access rules defined based one or more state variables for allowing and/or disallowing access to said one or more accessible components; and determining based on said one or more state-based access rules whether to allow and/or disallow access.

32. The method of claim 31, wherein said computer-implemented method further comprises: defining and/or modifying one or more access rules based on input.

33. The method of claim 32, wherein said input is effectively provided by and received from a user.

34. A method of providing an active state-aware reference monitor for a computing system, wherein said computer-implemented method comprises:

determining that a first component of said computing system is requesting and/or attempting to access an accessible component of said computing system;

obtaining one or more state-based access rules for accessing said accessible component, wherein said one or more state-based access rules include one or more state variables associated with said computing system;

obtaining current values of said one or more state variables;

determining based on said one or more current values whether to grant said first component access to said accessible component;

granting said first component permission to access said accessible component when said determining determines to grant access to said accessible component;

initiating monitoring of said one or more state variables when said first component is granted access to said accessible component;

determining based on said monitoring whether to withdraw said permission to access said accessible component; and withdrawing said permission to access said accessible component, thereby effectively preventing said first component from further accessing said accessible component;

wherein session-aware access control is provided based on the state variables.

35. The method of claim 34, wherein said computer-implemented further comprises one or more of the following:

terminating said monitoring of said one or more state variables when said first component becomes inactive and/or incapable of accessing said accessible component; and receiving from a first component of said computing system a request to access a second component of said computing system.

36. The method of claim 34, wherein said monitoring comprises:

detecting a change in at least one of said one or more state variables; and determine whether said change to said at least one variable is acceptable; thereby effectively reevaluating said rule.

37. A non-transitory computer readable medium including executable program code embodied in a tangible form for an active state-aware reference monitor controlling access to one or more components of a computing environment and/or system, wherein said computer readable medium includes:

computer program code for monitoring one or more state-based disallow-access conditions after permission to access said one or more accessible components has been granted, wherein each state-based disallow-access condition defines a condition for a state variable associated with said one or more accessible components, and wherein allowed access to said one or more accessible components is disallowed when at least one of said state-based disallow-access conditions has been met;

computer program code for determining whether at least one of said one or more state-based disallow-access conditions has been met; and computer program code for withdrawing said permission to access to said one or more accessible components when at least one of said one or more state-based disallow-access conditions has been met.

\* \* \* \* \*